United States Patent [19]

Mueller, Jr.

[11] 4,033,425

[45] July 5, 1977

[54] VEHICLE CONTROL SYSTEM

[75] Inventor: Otto Mueller, Jr., Detroit, Mich.

[73] Assignee: Massey-Ferguson Inc., Detroit, Mich.

[22] Filed: Dec. 22, 1975

[21] Appl. No.: 643,418

[52] U.S. Cl. ............... 180/77 R; 74/511 R; 308/239
[51] Int. Cl.² ......................................... B60K 26/00
[58] Field of Search .......... 180/77 R, 77 H, 77 HT, 180/89, 90.6; 296/28 C; 277/98, 99, 175; 74/470, 485, 486, 487, 488, 489, 490, 511, 492, 504; 308/237, 239, 26, 32

[56] References Cited

UNITED STATES PATENTS

| | | | |
|---|---|---|---|
| 1,673,952 | 6/1928 | Schmidt | 180/77 R |
| 2,620,208 | 12/1952 | Patch et al. | 180/90.6 X |
| 2,639,928 | 5/1953 | Robbins | 277/99 |
| 3,354,981 | 11/1967 | Swanson et al. | 180/77 R |
| 3,446,318 | 5/1969 | Duckett | 277/99 |
| 3,616,709 | 11/1971 | Malm | 180/77 R X |
| 3,831,704 | 8/1974 | Zuege | 180/89 R |
| 3,844,374 | 10/1974 | Downey | 180/90.6 |

FOREIGN PATENTS OR APPLICATIONS

| | | | |
|---|---|---|---|
| 499,098 | 10/1949 | Belgium | 74/490 |
| 278,505 | 10/1930 | Italy | 180/90.6 |

Primary Examiner—Joseph F. Peters, Jr.
Assistant Examiner—J. D. Rubenstein
Attorney, Agent, or Firm—John C. Thompson

[57] ABSTRACT

A control system for a tractor vehicle having an operators station resiliently mounted relative to the chassis in which the control system passes through a wall of the operators station and incorporates mounting means acting to support the control system to accommodate relative movement between the operators station and chassis and also to act as a seal to prevent passage of dust and dirt to the operators station and in addition, to act as a suspension supporting the control system in a manner for dampening vibration and noise which otherwise would be transmitted through the control system to the operators station.

10 Claims, 4 Drawing Figures

VEHICLE CONTROL SYSTEM

This invention relates to vehicle control systems and particularly to control systems for vehicles having an operators station resiliently mounted on the chassis of the vehicle.

Some vehicles such as tractors have an operators station in the form of an enclosed cab which is resiliently mounted on the chassis of the vehicle to absorb and isolate the transmission of vibration and noise from the chassis to the cab. With such vehicles movements of the control system at the interior of the cab to components at the exterior of the cab are affected by the relative movement between the cab and chassis. Also, such vehicles are often operated in an unfavorable environment in which the air is laden with dust and dirt and the controls admit the contaminated air into the interior of the cab through the points at which the controls pass through the cab to the chassis. In addition, such controls transmit vibrations and noise from the chassis mounted components, such as the transmission and hydraulic valves, through the control system to the interior of the cab. The noise transmitted is such a significant problem that in some geographical areas the maximum permissible noise level is regulated by law.

It is an object of the invention to provide a control system for a vehicle having an operators station resiliently mounted relative to the vehicle chassis in which relative movement of the cab and chassis is not transmitted to the control system.

It is another object of the invention to provide a control system for such vehicles in which portions of the control system passing through the wall are supported in a manner permitting relative motion of the cab and chassis and at the same time inhibit the transmission of sound and dirt from one side of a wall of the operators station to the other.

A control system has been provided for vehicles of the type having a resiliently mounted operators station on the chassis of the vehicle in which movement of a control member by the operator at one side of a wall member of the operator station is transmitted to a mechanism to be operated at the other side of the wall by means of a shaft which is affected by control movement but is not affected by relative movement between the cab and chassis. The shaft is supported by a mounting structure which includes a resilient member acting as a seal to prevent the introduction of dust and dirt from one side to the other of the wall of the operators station. The resilient member not only acts as a seal but acts as a resilient suspension for the shaft to inhibit the transmission of noise and vibration through the control linkages to the operators station. The mounting structure includes a grommet surrounding an opening in the operators station through which the shaft of the control system passes. The grommet acts to support a bearing engaged with the shaft and the shaft is biased so that the bearing member is pressed into firm engagement with the resilient grommet which acts as a seal and as a resilient suspension to absorb and dampen sound transmitted through the shaft.

Figure 1:
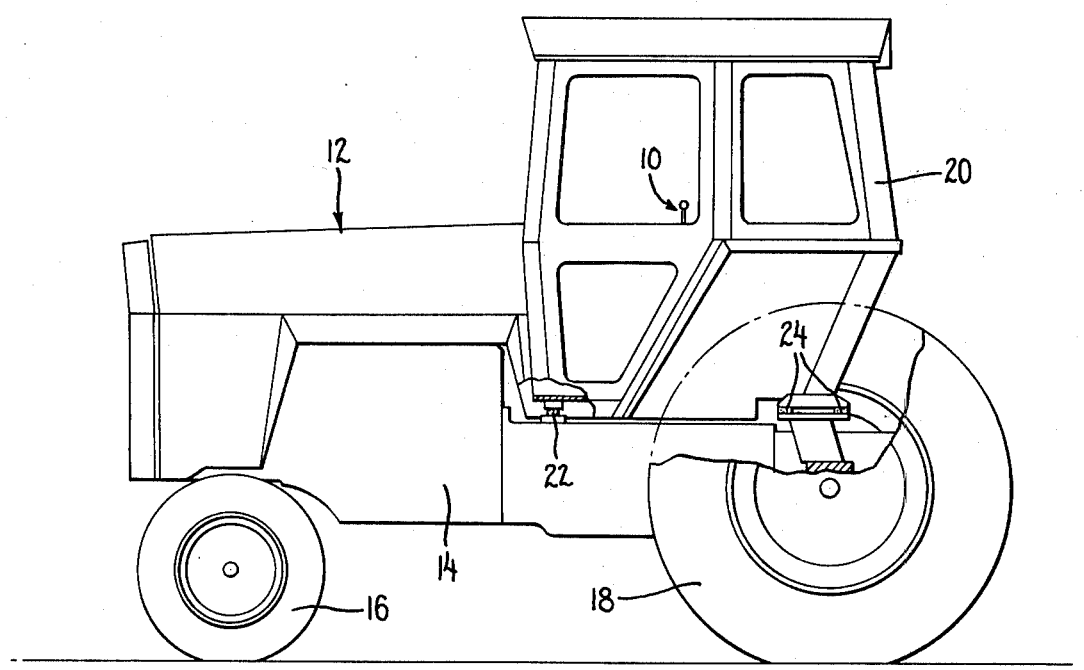
FIG. 1 is a side elevation of a tractor with a resiliently mounted operators station in which the control system of the present invention is embodied.

Referring to the drawings, the control system embodying the invention is designated generally at 10 and is particularly adapted for use with a vehicle such as a tractor 12 having a chassis 14 supported relative to the ground by front and rear wheels 16 and 18, respectively. The chassis 14 supports an enclosed operators station in the form of a cab 20 by means of rubber mounts 22 and 24 between the cab 20 and chassis 14. Such a mounting arrangement serves to isolate and insulate the cab 20 from noise and vibrations generated by the chassis 14.

Because of the resilient mounting of the cab 20 relative to the chassis 14, operation of the tractor 12 results in relative movement between the cab and chassis. The present control system 10 is particularly adapted to absorb such movement and at the same time to minimize the transmission of vibration and noise to the operators station without admitting dust and dirt from the exterior to the interior of the cab 20.

Figure 2:
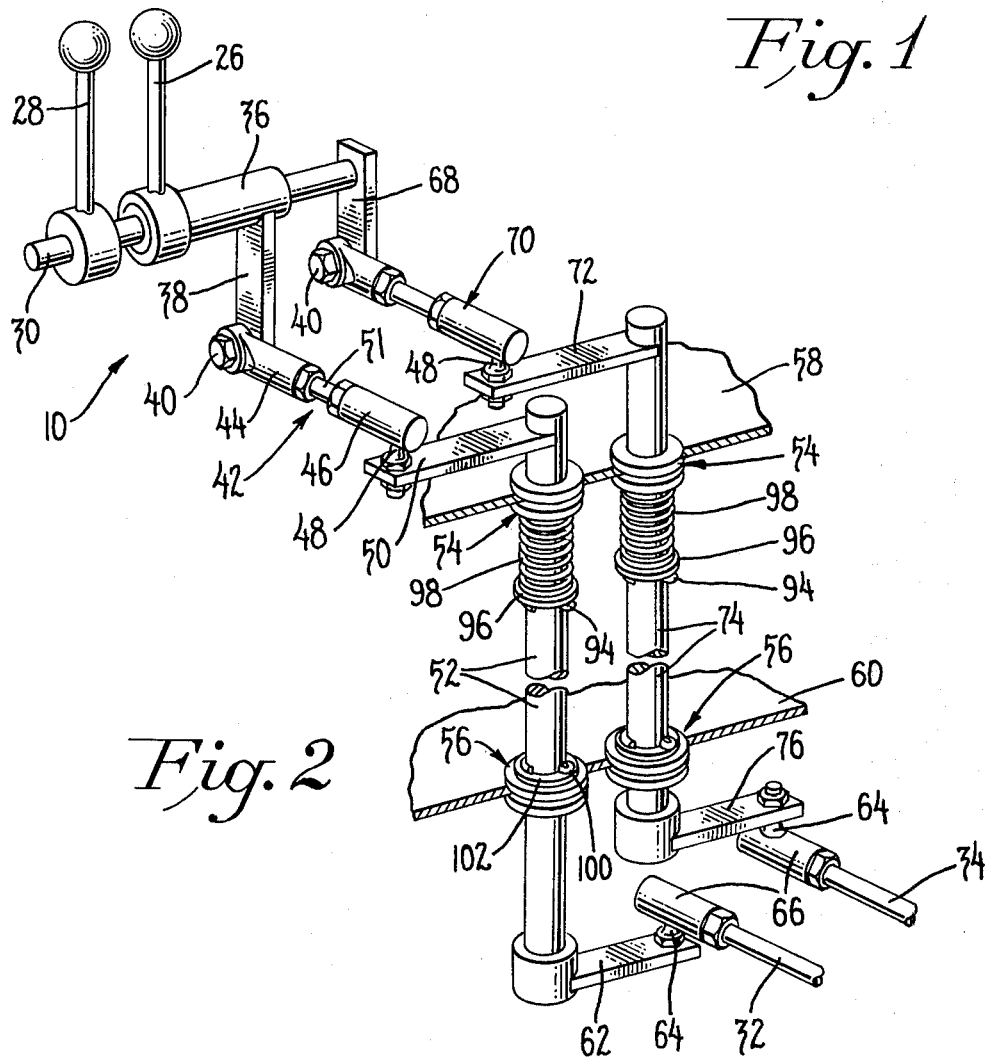
FIG. 2 is an enlarged perspective view of the control system embodying the invention with parts broken away for clarity.

Control system 10 as best seen in FIG. 2 includes a pair of control levers 26 and 28 which are movable in an arc about the axis of a shaft 30 to transmit control movement to a pair of links 32 and 34 at the exterior of the cab 20. The links 32 and 34 are connected in any conventional manner to devices to be operated such as the transmission controls or hydraulic valves.

The lever 26 has a collar 36 rotatably mounted on the shaft 30 which is rotatably supported in any conventional manner in the cab 20. Movement of the arm 26 relative to the axis of shaft 30 moves the collar 36 and a depending arm 38 connected to the collar 36. The free end of the arm 38 is pivotally connected by a pin or bolt 40 to a link assembly 42. The link assembly 42 includes a member 44 for receiving the bolt 40 and a member 46 which forms a socket for receiving a ball element 48 bolted at the free end of an actuating arm 50. The members 44 and 46 are threadably engaged with a link element 51 to permit adjustment of the length of the link assembly 42.

The actuating arm 50 is fixed to the upper end of a shaft 52. The shaft 52 is supported by a pair of spaced mounting assemblies 54 and 56 relative to a mounting bracket 58 and the partition or floor 60 of the cab 20 for rotational movement and limited axial movement. The mounting bracket 58 is supported in fixed relation to the interior of cab 20 and may form a part of a control console. The lower end of the shaft 52 which depends below the floor of the cab is provided with a radially extending arm 62 the free end of which is provided with a ball element 64 which is received in a socket member 66 forming a part of the link assembly 32.

The control system associated with the lever 28 is generally similar to that associated with the lever 26. However the lever 28 is non-rotatably connected to the shaft 30 so that movement of the lever 28 transmits motion to a depending arm 68 having its end pivotally connected to a link 70 identical to the link 42. The link 70 is connected to an actuating arm 72 rigidly connected to extend radially from the upper end of the shaft 74. The lower end of shaft 74 is provided with an actuating arm 76 connected by a ball element 64 and socket member 66 identical to that associated with the link 32.

The linkage system associated with the levers 26 and 28 are generally similar except that the actuating arms 50 and 62 are disposed at a lower elevation than the actuating arms 72 and 76 for the purpose of permitting the shafts 52 and 74 to be mounted in more closely spaced relationship and still afford clearance for swinging movement of the upper arms 50 and 72 and lower arms 62 and 76.

Figure 4:
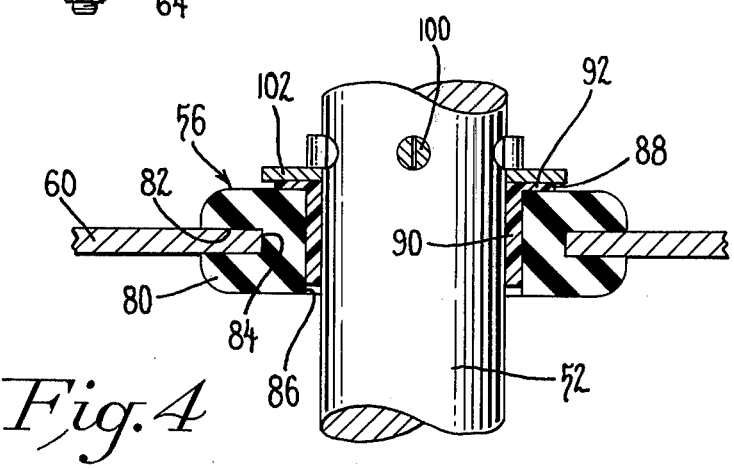
FIG. 4 is an enlarged view of a portion of the control system shown in FIG. 3.

The mounting assemblies 54 and 56 by which the shafts 52 and 74 are mounted relative to the floor 60 of the cab 20 and the bracket 58 of the console are generally identical. As best seen in FIG. 4, the mounting assembly 56 associated with the cab floor 60 includes a grommet 80 which has an annular groove 82 receiving the periphery of an opening 84 formed in the cab floor. The grommet 80 has a central opening 86 which supports a bearing element 88 having a tubular bearing portion 90 for engagement with the shaft 52 and a radially extending flange 92 which engages an upper face of the grommet 80. The bearing element 88 is preferably made of a plastic material such as nylon or the like. The grommet 80 acts to resiliently suspend the plastic bearing element 88 in spaced relation to the edges of the opening 84 in the floor 60.

The mounting assembly 54 associated with bracket 58 at the upper end of the shaft 52 is identical to the mounting assembly 56 except that the bearing 88 is disposed with its flange 92 at the underside of the associated grommet 80. The mounting assemblies 54 and 56 associated with the shaft 74 are identical to the mounting assembly 56 previously described and are similarly arranged at the upper and lower ends of the shaft 74.

Figure 3:
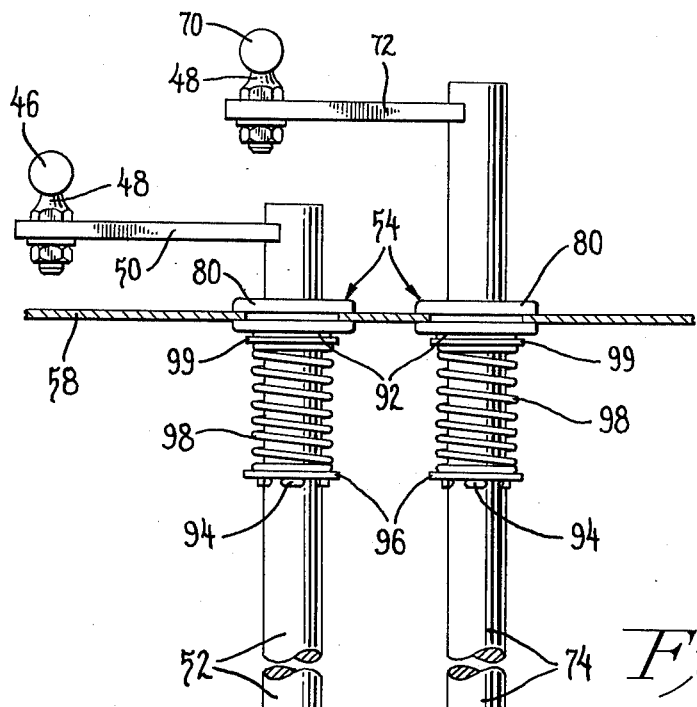
FIG. 3 is an enlarged sectional view taken generally transversely of the tractor and through a portion of the control system.
Figure 3:
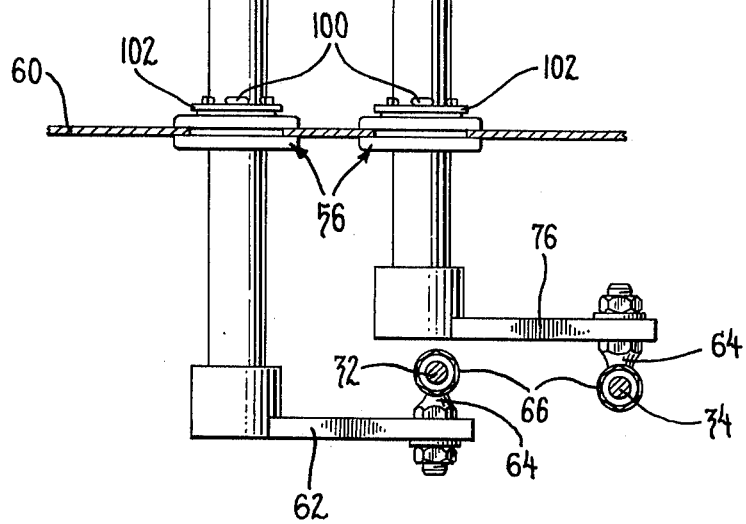

Referring now to FIG. 3, the shafts 52 and 74 are each provided with an opening to receive a cotter pin 94 which acts as a stop for a annular element or washer 96. A coil spring 98 is mounted on each of the shafts with the lower ends seated on the washers 96 and the upper ends seated on washers 99 on the shafts and abutting the flanges 92 of the bearing element 88 associated with the upper mounting structure 54. The spring 98 acts axially of the shaft 52 to urge it downwardly toward the floor 60. The lower ends of the shafts 52 and 74 are provided with openings to receive cotter pins 100 which act downwardly on washers 102 mounted on each of the shafts to act as stop means limiting downward movement of the shafts. The springs 98 urge the shafts downwardly so that the pins 100 engage the washers 102 and press them into firm engagement with the bearings 88 associated with the grommets 80 of the lower mounting assemblies 56. In so doing the flanges 92 of the bearings are pressed into sealing engagement with the grommet 80 to prevent the passage of dust to the interior of the cab through the opening 86 in the floor 60 and grommet opening 86.

During operation of the tractor 12, the cab 20 forming the operators station moves generally vertical relative to the chassis 14 due to the rubber cab mounts 22 and 24. Such relative movement of the cab and chassis has a minimum effect on the control lever system 10 due to the vertical disposition of the torque shafts 52 and 74 which are rotatably mounted and also may move axially upward relative to the cab against the biasing action of the springs 98. The ability of the shafts to move axially absorbs the principal relative movement between the cab and chassis which is in a general vertical direction. The effect of such vertical movement between cab and chassis is further minimized by the ball and socket connections 64, 66 to the links 32 and 34 and the ball and socket connections 46, 48 to the links 42 and 70. The ball and socket connections permit axial displacement of the shafts 52 and 74 for all rotated control positions of those shafts during control movement of the levers 26 and 28. The mounting assemblies 54 and 56 which resiliently mount the shafts 52 and 74 also accommodate any relative movement between the cab floor 60 and the bracket 58 forming the top of the control console which may occur due to any twisting or distortion of the cab requiring angular tilting or displacement of the shafts 52 and 74 about their normal rotational axes.

The bearings 88 which are supported by the grommet 60 afford free axial and rotational movement of the shafts 52 and 74 and the springs 98 acting between the shafts and the upper mounting assemblies 54, urge the upper and lower bearings 88 in opposite directions from each other and relative to their associated grommets 80 to maintain the flanges 92 of the bearing 88 firmly seated in sealing relationship to the grommets to prevent the passage of dust and dirt through the openings 84 and the cab floor 60 to the interior of the cab. The grommets act also to isolate the metal shafts 52 and 74 from the supports formed by the cab floor and the console bracket 58 so that vibrations and sound from the exterior of the cab and particularly from the transmission and hydraulic valves operated by the control links 32 and 34 are dampened and are not transmitted to the cab.

A control system has been provided for vehicles in which an operators station such as an enclosed cab is resiliently supported relative to the chassis so that relative movement of the cab and chassis is isolated from movement of the control system and at the same time the control system is mounted in a manner so that portions passing through the cab to the chassis are sealed to prevent the entry of dust and dirt to the interior of the cab. In additions, the control system mounting arrangement acts to accommodate relative cab and chassis movement and to dampen sound and noise which otherwise would be transmitted from mechanisms at the exterior of the cab to the interior of the operators stations.

I claim:

1. A control system for a vehicle having an operators station including an apertured partition resiliently supported relative to the vehicle chassis, the combination of; a movable control member at one side of said partition, a mechanism to be controlled at the other side of said partition, a shaft passing through an aperture in said partition, mounting means on said partition supporting said shaft for rotational and axial movement, said mounting means including a bearing element engagable with said shaft and a resilient seal disposed between said bearing element and said partition, stop means on said shaft engagable with said bearing element to limit axial movement of said shaft in one direction relative to said partition, resilient means urging said shaft in said one direction to maintain said bearing element in sealing engagement with said seal, and means connecting said shaft to said control member and to said mechanism to transmit movement of said control member to said mechanism.

2. The combination of claim 1 in which said seal has portions disposed radially of said bearing to permit limited angular displacement of said shaft relative to said partition, 3. The combination of claim 2 in which said seal is a resilient grommet having portions engaging opposite sides of said partition adjacent to said shaft.

4. The combination of claim 3 in which said bearing has portions extending radially from said shaft and presenting a surface engagable with said grommet, said stop means being engagable with said radially extending portion to urge said bearing into sealing engagement with said grommet.

5. The combination of claim 1 in which said means connecting said shaft to said control mechanism includes an arm disposed at the other side of said partition and extending radially from said shaft, and a universal connecting means at the end of said arm and connected to said mechanism.

6. The combination of claim 1 in which said means connecting said shaft to said control member and said mechanism includes spaced arms extending radially from said shaft at opposite sides of said partition and a pair of universal connecting means operatively connected to said arms and said control member and mechanism, respectively.

7. The combination of claim 1 in which said stop means includes an annular element supported on said shaft.

8. The combination of claim 1 in which said resilient means is a spring disposed axially of said shaft.

9. The combination of claim 1 and further comprising a bracket at one side of said partition, an additional mounting means including an additional bearing and an additional seal associated with said bracket for supporting said shaft at axially spaced points relative to said partition and said bracket.

10. The combination of claim 9 in which said resilient means acts between spaced points on said shaft and on said additional bearing to urge said shaft towards said other bearing.

* * * * *